US011692719B2

(12) United States Patent
Beutz

(10) Patent No.: US 11,692,719 B2
(45) Date of Patent: *Jul. 4, 2023

(54) METHOD AND APPARATUS FOR WINTERIZING SYSTEM COMPONENTS

(71) Applicant: Navsell LLC, Loveland, CO (US)

(72) Inventor: Lyle Eric Beutz, Westminster, CO (US)

(73) Assignee: NAVSELL LLC, Loveland, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/534,034

(22) Filed: Nov. 23, 2021

(65) Prior Publication Data

US 2022/0082270 A1    Mar. 17, 2022

Related U.S. Application Data

(63) Continuation of application No. 16/570,788, filed on Sep. 13, 2019, now Pat. No. 11,209,173.

(60) Provisional application No. 62/730,825, filed on Sep. 13, 2018.

(51) Int. Cl.
| | | |
|---|---|---|
| *F24D 19/00* | (2006.01) | |
| *G05B 19/042* | (2006.01) | |
| *E03B 7/12* | (2006.01) | |
| *B60S 1/48* | (2006.01) | |

(52) U.S. Cl.
CPC ............ *F24D 19/0095* (2013.01); *B60S 1/48* (2013.01); *B60S 1/481* (2013.01); *E03B 7/12* (2013.01); *G05B 19/0428* (2013.01); *F24D 2220/02* (2013.01); *Y10T 137/1189* (2015.04); *Y10T 137/1963* (2015.04); *Y10T 137/1987* (2015.04)

(58) Field of Classification Search
CPC .... F24D 19/0095; F24D 2220/02; B60S 1/48; B60S 1/481; E03B 7/12; Y10T 137/1189
See application file for complete search history.

(56) References Cited

U.S. PATENT DOCUMENTS

| | | | |
|---|---|---|---|
| 3,831,385 A * | 8/1974 | Hudson | ............... E02B 17/0021 |
| | | | 165/45 |
| 4,335,980 A * | 6/1982 | DePriester | ............ E21B 33/037 |
| | | | 405/61 |
| 5,217,687 A | 6/1993 | Sewell | |
| 6,152,059 A | 11/2000 | Del Raso | |
| 11,209,173 B2 | 12/2021 | Beutz | |
| 2004/0206394 A1 | 10/2004 | Swan | |

(Continued)

FOREIGN PATENT DOCUMENTS

KR        20150076703 A  *  7/2015

OTHER PUBLICATIONS

Official Action for U.S. Appl. No. 16/570,788, dated Jan. 1, 2021 10 pages.

(Continued)

*Primary Examiner* — Atif H Chaudry
(74) *Attorney, Agent, or Firm* — Sheridan Ross

(57) ABSTRACT

An onboard system for winterizing vessels includes an antifreeze storage system. The onboard system includes a control system capable of determining one or more of the one or more system components to be winterized, an antifreeze storage system, and one or more pumps capable of pumping antifreeze from the antifreeze storage system. The antifreeze flows through the determined one or more system components to be winterized.

20 Claims, 8 Drawing Sheets

(56) References Cited

U.S. PATENT DOCUMENTS

| | | |
|---|---|---|
| 2013/0197827 A1 | 8/2013 | Besore et al. |
| 2013/0255023 A1 | 10/2013 | Kikuta et al. |
| 2014/0261693 A1 | 9/2014 | Geerligs et al. |
| 2015/0076242 A1 | 3/2015 | Pyun et al. |
| 2019/0071156 A1* | 3/2019 | Choudhury ............. B63B 13/00 |

OTHER PUBLICATIONS

Official Action for U.S. Appl. No. 16/570,788, dated Jun. 25, 2021 12 pages.
Notice of Allowance for U.S. Appl. No. 16/570,788, dated Aug. 26, 2021 8 pages.

* cited by examiner

METHOD AND APPARATUS FOR WINTERIZING SYSTEM COMPONENTS

CROSS-REFERENCE TO RELATED APPLICATION

This application is a continuation of pending U.S. patent application Ser. No. 16/570,788, filed Sep. 13, 2019, entitled "METHOD AND APPARATUS FOR WINTERIZING SYSTEM COMPONENTS," which claims the benefit of priority under 35 U.S.C. § 119(e) from U.S. Provisional Application Ser. No. 62/730,825, filed Sep. 13, 2018, entitled "METHOD AND APPARATUS FOR WINTERIZING VESSEL SYSTEM COMPONENTS," which is incorporated herein by reference in its entirety by reference.

FIELD

The present disclosure is generally directed to systems and methods of winterizing plumbing systems. In particular, the present disclosure is directed to an antifreeze distribution system and a method of using such a system to winterize plumbing systems in vessels, vehicles, and other objects.

BACKGROUND

While a boat is typically used only in warm summer months, a boat owner must plan for the storage and survival of the boat during cold winter months. Systems onboard a boat can often be damaged by freezing temperatures. For example, a boat's engine, transmission, heat exchanger, ballast systems, wake enhancement ballast systems, wake sport ballast systems, plumbing systems, toilets, sinks, showers, hoses, wash stations, etc. may all be severely damaged if not properly prepared for freezing temperatures.

After a season of enjoying the use of a boat, the preparation of the boat to survive winter weather can cause boat owners a great amount of stress and take an excessive amount of time and trouble. To winterize systems onboard a boat, boat owners must displace water in the systems with antifreeze. As new boat-owners typically do not think about, or plan for, the winterization of the boat, the entire process of winterization may seem overly complex and confusing. As such, many boat owners rely on local boatyards to perform the process. Using a local boatyard to perform winterization can cost a boat-owner a large amount of unplanned expenses and often must be scheduled far in advance of the date of winterization.

Similarly, other types of vehicles require winterization. For example, many types of recreational vehicles such as motor homes, towable campers, travel trailers, teardrop campers, popup campers, etc. have plumbing systems which must be winterized. Also, some buildings such as cabins and tiny homes, and water systems such as pools, spas, and saunas, may likewise require winterization. Similar to the winterization of boats, described above, owners of recreational vehicles, other vehicles used for camping, and/or vacation homes may also be required to perform winterization. And like boats, the winterization of such buildings and/or vehicles often must be scheduled far in advance and may be the cause of a great deal of unplanned expenses.

DETAILED DESCRIPTION

Figure 1:
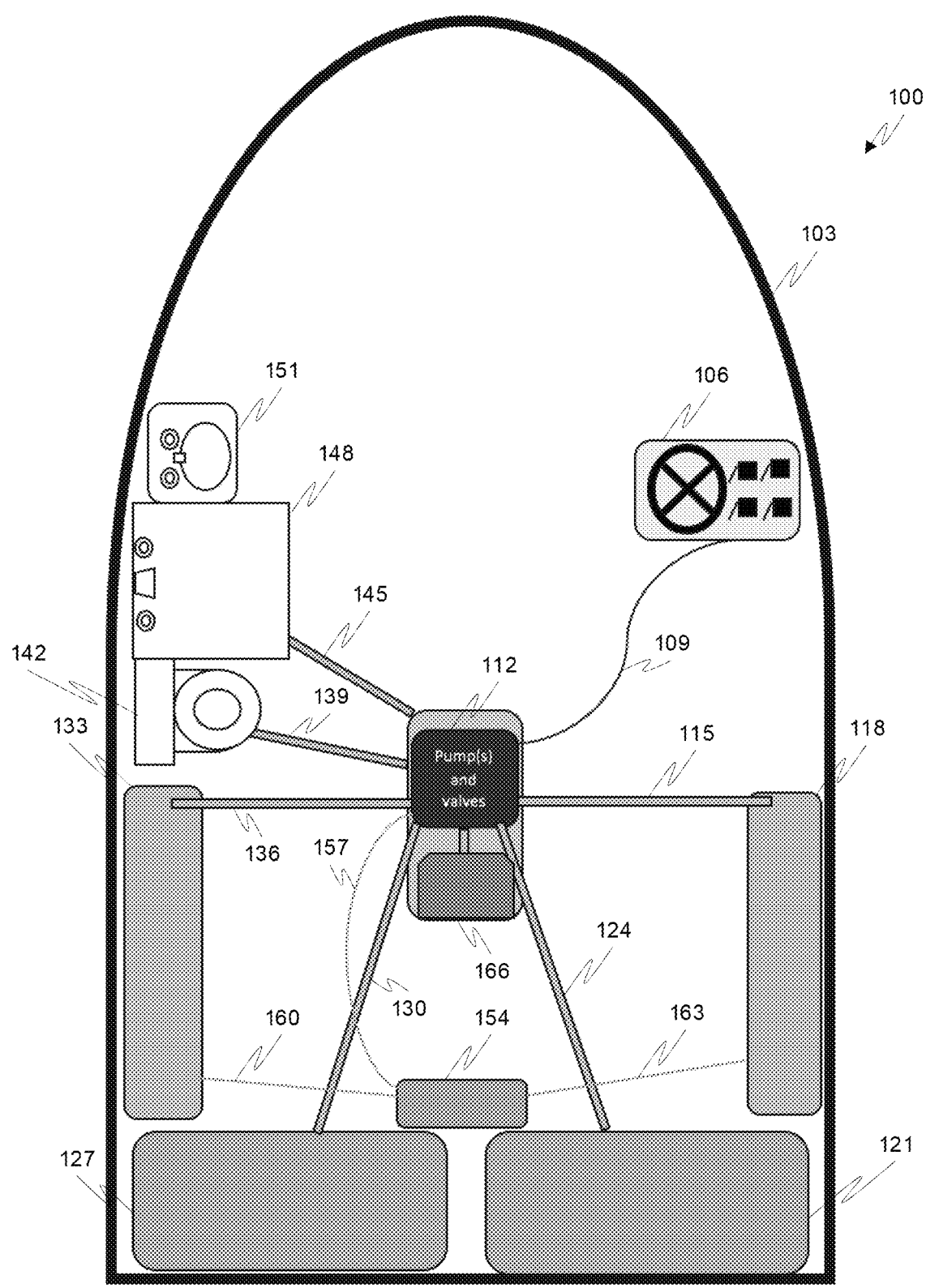
FIG. 1 illustrates a vessel with an onboard winterization system in accordance with one or more of the disclosed embodiments.

Antifreeze as used herein may refer to any liquid that is used to prevent damage to critical boat components by replacing or adding to water that is brought on board the vessel for various purposes, for example any fluid that is designed to prevent freezing of components. Antifreeze may be concentrated or pre-diluted. Concentrated antifreeze may be mixed with marine water or shore water. Concentrate antifreeze may be combined with water in a similar fashion to soda syrup concentrates that are blended on site at restaurants, convenient stores, etc. Antifreeze diluted or concentrated could be mounted/secured onboard the vessel and drawn into the winterization system. Concentrated antifreeze could be blended as it is fed to key components that need to be protected. In some embodiments, concentrated antifreeze may be blended/diluted with marine water as it is pumped on board and fed into antifreeze storage system.

The amount of planning and scheduling involved in winterizing a boat can greatly limit the use of a boat. Often a boat owner will schedule a winterization appointment with a boatyard far in advance of the day of the winterization. The goal for many boat owners may be to schedule a winterization on the last day before a big freeze. However, since contemporary methods of boat winterization are complex, scheduling winterizations with boatyards may be required to be made well ahead of time. Because of this delay, and the lack of reliable weather forecasts, a boat owner may schedule a winterization appointment prior to many days of warm weather and sunshine, leaving the owner unable to maximize the use of the boat.

Winterization of boats can be performed by an amateur boat owner with some preparation and knowledge over the course of an afternoon. However, a boat owner attempting a self-winterization of his or her boat may unintentionally skip winterizing a component of the boat and may cause a great amount of damage. Even a knowledgeable and thoughtful boat owner who is meticulous and pays attention to every detail still spends a great amount of time and stress gathering winterization supplies and performing the winterization.

In many cases, a boat owner may hope to perform the winterization of his or her boat as late as possible before the first instance of winter weather, thus maximizing time enjoying the boat. Because winter weather can come at a moment's notice, what is needed is a system which can be activated immediately and quickly to winterize key systems of a boat without requiring advance planning. As disclosed herein, such a system can be installed onboard a boat or other vehicle and can be activated and can winterize systems onboard the boat, or other vehicle, without even requiring a human user of the boat to be present. Using such a system, a boat owner can be miles away from his or her boat and upon learning of coming winter weather, can perform the winterization process without visiting a number of supply stores or even travelling to the boat itself.

Throughout the present disclosure, systems are described in relation to the winterization of boats and other types of vessels. The disclosure should not, however, be considered as being so limited. The winterization of any type of plumbing system, be it a plumbing system in a motor home or other type of recreational vehicle ("RV") or in a vacation home such as a cabin or tiny home may very similar or the same as the onboard winterization systems described herein.

For example, while certain embodiments describe a system for the winterization of boats and other types of vessels, the disclosure should be considered as including systems relating to the winterization of any type of plumbing system, such as in a motor home or other type of recreational vehicle ("RV"), in a vacation home such as a cabin or tiny home. Winterization systems may be associated with any one or more of vessels with fresh water systems, camping vessels such as campers, trailers, motorhomes, popups, Coaches, Toter homes, expedition campers, vans for camping, expedition campers, and other types of RVs, etc. Any type of vessel or vehicle, such as modul, bus, truck sleeper, semi trucks, etc. may be winterized as described herein.

Furthermore, winterization systems as described herein may be used with water systems such as hot tubs, spas, swimming pools, saunas, etc. Winterization systems may also be used with buildings such as vacation homes. For example, plumbing systems of condos, houses, mansions, tiny homes, trailer homes, modular homes, and manufactured homes may be winterized using systems as described herein.

In some embodiments, an onboard winterization system may comprise one or more pumps, valves, plumbing systems, and onboard antifreeze storage systems. The onboard winterization system may be capable of drawing antifreeze from the storage system into one or more vessel components. Vessel components may comprise, but are not limited to, engine, transmission, heat exchanger, ballast systems, wake enhancement ballast systems, wake sport ballast systems, plumbing systems, toilets, sinks, showers, hoses, wash stations, etc.

An antifreeze storage system could be a plastic tank, box, bottle, or the like that can be bought by a boat owner or delivered and could easily be slipped into place in such a way that pouring may not be necessary. An antifreeze storage system may be made of solid material with a bladder inside. Boxes of antifreeze may be mailed to users of an onboard winterization system. A vessel may comprise one or more installed racks in which to secure the boxes of antifreeze onto the vessel.

An onboard winterization system may simplify the process of winterizing vessel components to prevent damage from freezing temperatures by replacing water with an antifreeze fluid or by adding antifreeze material to water in such components. Such a system may enable boat-owners to winterize a boat without needing to schedule an appointment, load the boat on a trailer, gather winterization materials, or even physically be present at the boat.

A vessel in accordance with one or more of the disclosed embodiments may comprise one or more of one or more engines, one or more transmissions, one or more outdrives, one or more heat exchangers, a propeller shaft sealing system, as well as driveline components that utilize marine water cooling, such as, but not limited to MMP seals, deep sea seals, PSS seals and/or any other various systems associated with the drive train. Many of these drivetrain systems may be cooled by water. In some embodiments, marine water may be pumped from a body of water the vessel floats in and may be pumped into a drivetrain cooling system and used to cool the drivetrain components as well as a number of other components.

An onboard winterization system 100 is illustrated in FIG. 1. As can be appreciated, a vessel 103 may comprise one or more plumbing system components 142, 148, 151. Plumbing system components 142, 148, 151 may use water or other liquids which may freeze in the event of cold weather. In some embodiments, a plumbing system may comprise one or more required plumbing systems and/or amenities that use water, such as sinks 151, showers 148, toilets 142, water heaters, heat exchangers, etc. In some embodiments, plumbing system components may comprise waste water storage systems for storing gray water and/or sewage. In some embodiments, plumbing system components may additionally comprise deck hoses, fish cleaning stations, outdoor showers, etc.

A vessel may comprise one or more plumbing systems and components. For example, a vessel may comprise a sink, a shower, a toilet, etc. Such plumbing systems and components may comprise one or more water lines, tubes, pipes, etc.

For example, a sink may comprise an inlet water line, running from a water source into the sink, a through water line, running from the inlet water line to the faucet, a drain water line, running from a drain of the sink to an outlet water line, and an outlet water line running from the drain water line to one or more of a gray water storage system, a sewage system, or an output of the vessel. Antifreeze is flushed through all critical components of the vessel including pumps and valves. Antifreeze for onboard systems may be recovered and drawn back into the antifreeze storage system. Or, the antifreeze can be discharged from the vessel.

Similarly, a shower may comprise an inlet water line, running from a water source into the shower, a through water line, running from the inlet water line to the shower head, a drain water line, running from a drain of the shower to an outlet water line, and an outlet water line running from the drain water line to one or more of a gray water storage system, a sewage system, or an output of the vessel.

A toilet may comprise an inlet water line, running from a water source into the toilet, a through water line, running from the inlet water line to the toilet tank, a drain water line, running from a drain of the toilet to an outlet water line, and an outlet water line running from the drain water line to one or more of a gray water storage system, a sewage system, or an output of the vessel.

Many recreational vessels further comprise a ballast system 121, 127, as illustrated in FIG. 1. A ballast system may comprise one or more compartments 121, 127 within a vessel 103. Ballast systems operate so as to provide weight in particular areas of a vessel in order to provide control over a shape of a wake in the water behind the vessel during operation. Typically, a ballast system holds water to act as the weight. Ballast systems may provide stability, increase a height or pitch of a wake, or shift weight for a vessel. The use of water in a ballast system tank may allow for an easier adjustment of weight.

The use of a ballast in the stern area of a vessel may result in a wake that is steeper and shorter, providing a more abrupt transition from a trough of the wake to a peak of the wake. The use of a ballast in the bow area of a vessel may result in a wake that is shaped less steep and longer, providing a less abrupt transition from a trough of the wake to a peak of the wake. The ability to alter the weight of a ballast, by altering the amount of liquid within the ballast, may provide greater flexibility in the use of the vessel for watersports such as waterskiing and wakeboarding.

In order to provide an onboard winterization system, a vessel 103 may further comprise one or more antifreeze storage systems 118, 133. Antifreeze storage systems 118, 133 may comprise any type of container that may hold an antifreeze solution. For example, an antifreeze storage system may comprise one or more of a flexible bladder, a solid tank, a box, a box with a bladder inside, and/or a bottle. In some embodiments, one or more ballast compartments 121, 127 may be used as, or as part of, an antifreeze storage system. An antifreeze storage system may be made of any type of material, such as a flexible material, a solid material, a solid material lined with a bladder, plastic, metal, etc. Antifreeze storage systems may also be either permanently or temporarily mounted to the vessel. During the course of a year, antifreeze may be stored in an antifreeze storage system to be used at the beginning of a colder season in order to be used for winterization of system components.

A system of tubes 115, 124, 130, 136, 139, 145 may extend from the antifreeze storage system of a vessel 103 into one or more system components as illustrated in FIG. 1. Water tubes within each system component, such as plumbing systems 142, 148, 151 and drivetrain cooling systems 166, may have an input tube leading from the antifreeze storage system into the system component. One or more valves may be used to route antifreeze tubing throughout the vessel. In some embodiments, each system component may have an antifreeze tube leading directly from the antifreeze storage system. In some embodiments, antifreeze may be directly to some system components indirectly from the antifreeze storage system through other system components.

System components, in addition to having inflow from the antifreeze storage system, each system component may also have outflow tubing, allowing for water to be pumped out of the system component.

As illustrated in FIG. 1, a vessel may comprise a system of one or more pumps and valves 112. Pumps may be used to draw antifreeze to system components in order to be winterized. In some embodiments, a pump may be mounted on the antifreeze storage system. In some embodiments, one or more pumps may be placed throughout the vessel, along antifreeze tubes leading between system components. Such pumps may be capable of drawing antifreeze throughout the system components. Pumps may also be used to draw water out of system components. Pumps may be controlled by an onboard processing unit, as illustrated in FIG. 1.

In some embodiments, water flow to, through and from, system components may rely solely on gravity. In some embodiments, one or more pumps may be used to enable and/or control the amount of flow of fluid through the various lines, tubes, and/or pumps in system components. For example, a pump may be placed along a water line leading from a water storage system to a plumbing and/or drivetrain cooling system component. A pump may also be placed on the outlet side of the plumbing and/or drivetrain cooling system component.

Valves may also be used to direct and control the flow of antifreeze throughout the vessel. The direction and amount of flow through each of the valves onboard the vessel may be controlled by the onboard processing unit. For example, the flow of antifreeze to some onboard system components may be limited while antifreeze flows to other system components.

Water lines throughout system components may be interconnected and may be connected to one or more valves. Valves may be used to shut off or enable water flow into or out of a system component. Valves may also be used to direct flows between components. A valve may be capable of switching a flow from an inlet between various system components. For example, a valve may be connected to a water line running from a water storage system and to a number of other water lines running to a number of different plumbing and/or drivetrain cooling systems. The valve may be used to control which one or more if any systems receive the water in the storage system.

In some embodiments, antifreeze stored onboard the vessel 103 may be in the form on an antifreeze concentrate. Antifreeze concentrate may be stored onboard the vessel 103 in an antifreeze concentrate storage compartment 154. As discussed in further detail herein, an antifreeze concentrate storage compartment 154 may be in connection with one or more antifreeze storage compartments 118, 133 via one or more tubes 160, 163. The antifreeze storage compartments 118, 133 may be capable of mixing the antifreeze concentrate with water to create useable antifreeze, as discussed herein. In some embodiments, the antifreeze concentrate storage compartment 154 may be connected to one or more pumps and/or valves 112 in order to be mixed with water or another liquid via a tube 157.

In some embodiments, a vessel 103 may comprise a drivetrain cooling system 166. A drivetrain cooling system 166 may one or more water lines, tubes, pipes, etc. which may be used to flow water around drivetrain system components, whereby the drivetrain system components may be cooled. In some embodiments, a drivetrain cooling system may comprise one or more radiators, fans, or other cooling elements.

A drivetrain cooling system may comprise an inlet water line, running from a water source into the drivetrain cooling system, a through water line, running from the inlet water line around elements of the drivetrain, a drain water line, running from an output of the drivetrain cooling system to an outlet water line, and an outlet water line running from the drain water line to one or more of a gray water storage system, a sewage system, or an output of the vessel.

In addition or instead of plumbing and/or drivetrain cooling systems and components, a vessel may comprise one or more other components comprising water lines, tubes, and/or pipes. The presently disclosed systems and methods may be used in similar ways with any component comprising an inlet water line and an outlet water line.

In some embodiments, one or more sensors may be placed throughout the vessel. Sensors may be placed along one or more water lines, pipes, tubes, etc. and may be capable of determining a rate of flow, a presence of antifreeze or water in the lines, pipes, tubes, etc., or other factors. Sensors may also be placed in one or more storage systems, for example antifreeze storage systems, water storage systems, sewage storage systems, etc. Such sensors may be capable of determining a level of fluid within such storage systems.

A controller computer system 106 may be onboard a vessel 103 and may be capable of interacting with and controlling one or more of the pumps and/or sensors onboard the vessel 103 via one or more communication channels 109. A controller 106 may also be capable of communicating with devices external to the vessel 103 as well as receiving instructions from such external devices.

While the elements of FIG. 1 describe a vessel in accordance with at least some of the disclosed embodiments, vessel design, purpose, and amenities are unlimited. Therefore, not all the components illustrated, may be required to achieve the purpose and use of the automatic vessel winterizing system. Moreover, the disclosed system may comprise certain embodiments with a greater number of components than those illustrated in the figures.

Furthermore, while FIG. 1 describes a system for the winterization of boats and other types of vessels, the disclosure should not be considered as being so limited. The winterization of any type of plumbing system, such as in a motor home or other type of recreational vehicle ("RV") or in a vacation home such as a cabin or tiny home may very similar or the same as the onboard winterization systems described herein.

Figure 2:
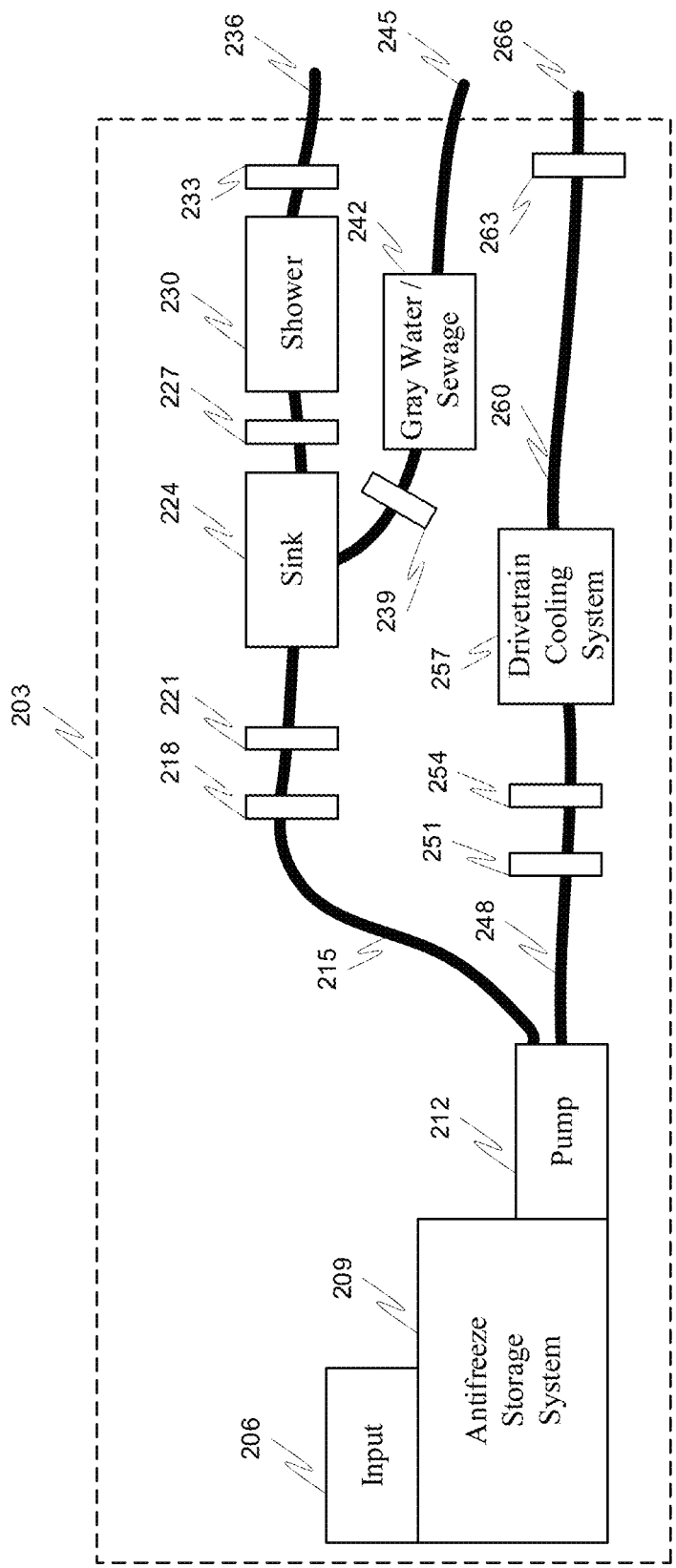
FIG. 2 is a block diagram of a winterization system in accordance with one or more of the disclosed embodiments.

As illustrated in FIG. 2, a series of pumps, valves, and tubes may connect an antifreeze storage system to a number of system components. Each pump and valve may be connected to, and controlled by, an onboard antifreeze flow controller.

As illustrated in FIG. 2, a vessel 203 may comprise an antifreeze storage system 209. An antifreeze storage system 209 may be capable of storing an amount of antifreeze or antifreeze concentrate.

An antifreeze storage system 209 may comprise an input 206. An input 206 to an antifreeze storage system 209 may enable a user of a vessel to fill an antifreeze storage system 209 with antifreeze or antifreeze concentrate. In some embodiments, an antifreeze storage system 209 may be easily mounted into or removed from the vessel 203. In such embodiments, an input 206 may not be necessary.

A vessel 203 may comprise a pump 212 capable of drawing antifreeze or antifreeze concentrate from an antifreeze storage system 209. In some embodiments, a pump may not be required to extract antifreeze from the antifreeze storage system. Gravity can, in some embodiments, be a substitute for a pump by mounting the antifreeze storage system at a higher level.

In some embodiments, antifreeze may be passively drawn from the antifreeze storage system. One or more water pumps of one or more engines of the vessel may be used to draw antifreeze from the antifreeze storage system.

As illustrated in FIG. 2, antifreeze may be pumped through one or more tubes 215 to more plumbing systems for example a sink 224, a shower 230, or a graywater and/or sewage storage system 242. Antifreeze may also be pumped through one or more tubes 248 to one or more drivetrain cooling systems 257. As can be appreciated from the figure, in some cases antifreeze may be pumped to one or more components before reaching other components for example as illustrated in FIG. 2 antifreeze may first pass through the sink 224 before reaching the gray water and/or sewage storage system 242. Antifreeze can be delivered passively from sinks, toilets and showers, or in some cases directly introduced into wastewater storage via pumps and/or valves.

Along the one or more various tubes, lines, pipes, etc., vessel 203 may comprise one or more sensors 218, 227, 233, 239, 251, 263. Such sensors may be used to measure a number of variables such as liquid temperature rate of flow, content of water versus antifreeze, etc. Data from the sensors may be transmitted to one or more controllers onboard the vessel.

The vessel may also comprise one or more pumps 221, 254 along the various tubes, lines, pipes, etc. Pumps may be used to adjust the rate of flow of antifreeze through various system components. Pumps may be controlled by one or more on board controllers.

As can be appreciated in FIG. 2, a vessel 203 may comprise one or more outlets 236, 245, 266 in which water and or antifreeze for other liquids may be expelled from the vessel 203.

Figure 3:
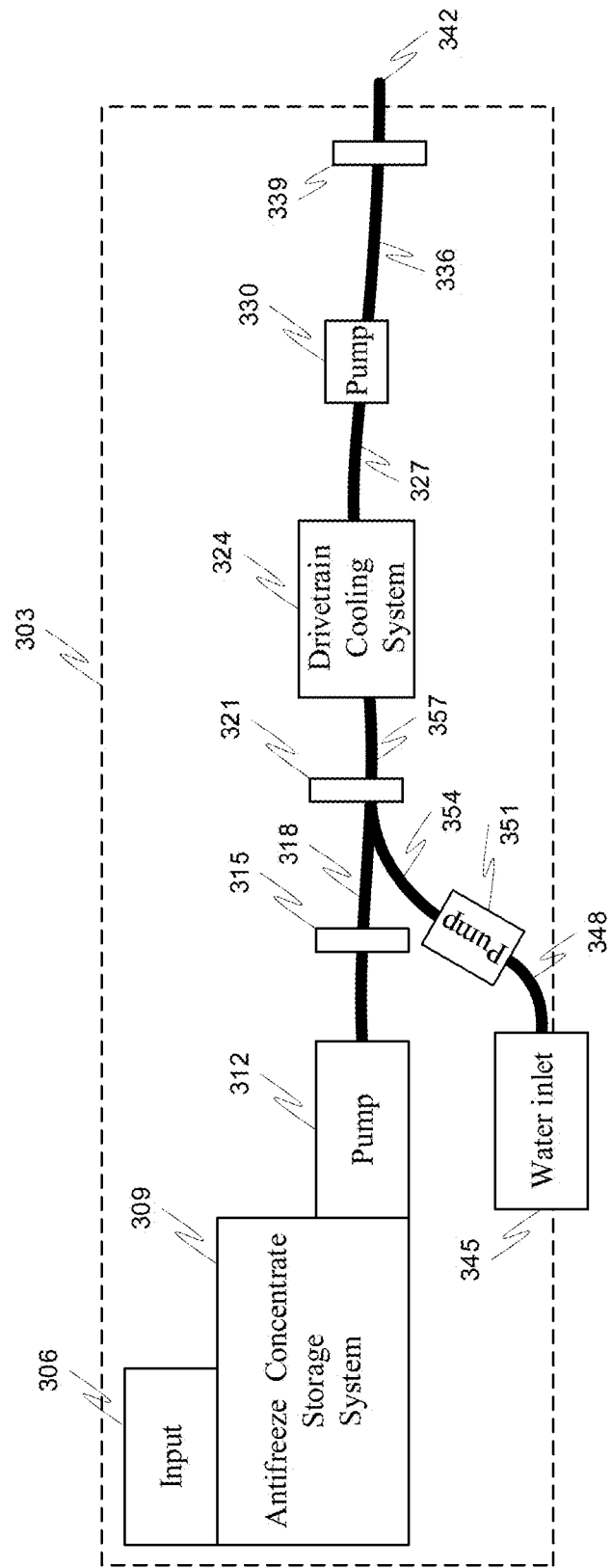
FIG. 3 is a block diagram of a winterization system for a drivetrain cooling system in accordance with one or more of the disclosed embodiments.

In some embodiments, such as illustrated in FIG. 3, antifreeze may be stored onboard a vessel 303 in the form of antifreeze concentrate. A simplified illustration of such embodiments is illustrated in FIG. 3. As can be appreciated, a vessel 303 may comprise an antifreeze concentrate storage system 309 as well as a water inlet port 345. A vessel 303 may comprise an input 306 to the antifreeze concentrate storage system 309. An input 306 may be used by a user of the vessel 303 to add antifreeze concentrate to the antifreeze concentrates storage system 309. A pump 312 may be connected to the antifreeze concentrate storage system 309 and may be capable of pumping antifreeze concentrate from the antifreeze concentrates storage systems 309 via one or more various tubes, lines, pipes 318. A water inlet port 345 may allow water to be pumped into one or more water lines, tubes, pipes 348 of the vessel 303. A pump 351 may be used to pump water into the vessel 303 via the water inlet port 345. Water and antifreeze concentrate may be combined to create antifreeze which may be pumped into a drivetrain cooling system 324 via a tube 357. One or more sensors 315, 321 may be placed along the various tubes, lines, pipes, etc. throughout the vessel.

Once combined, the antifreeze mixture may enter a drivetrain cooling system 324 via a tube 357. A pump 330 may be connected to the drivetrain cooling system 324 by an outlet tube 327. A pump 330 may be used to draw antifreeze through the drivetrain cooling system and out of an outlet port 324 of the vessel 303 via a tube 336. A sensor 339 may be placed along the tube 336 such that a controller of the vessel may monitor the flow of antifreeze and/or water from the vessel 303. The sensor 339 may monitor a rate of flow, a temperature, or an antifreeze content level of the liquid passing through the tube 336.

Figure 4:
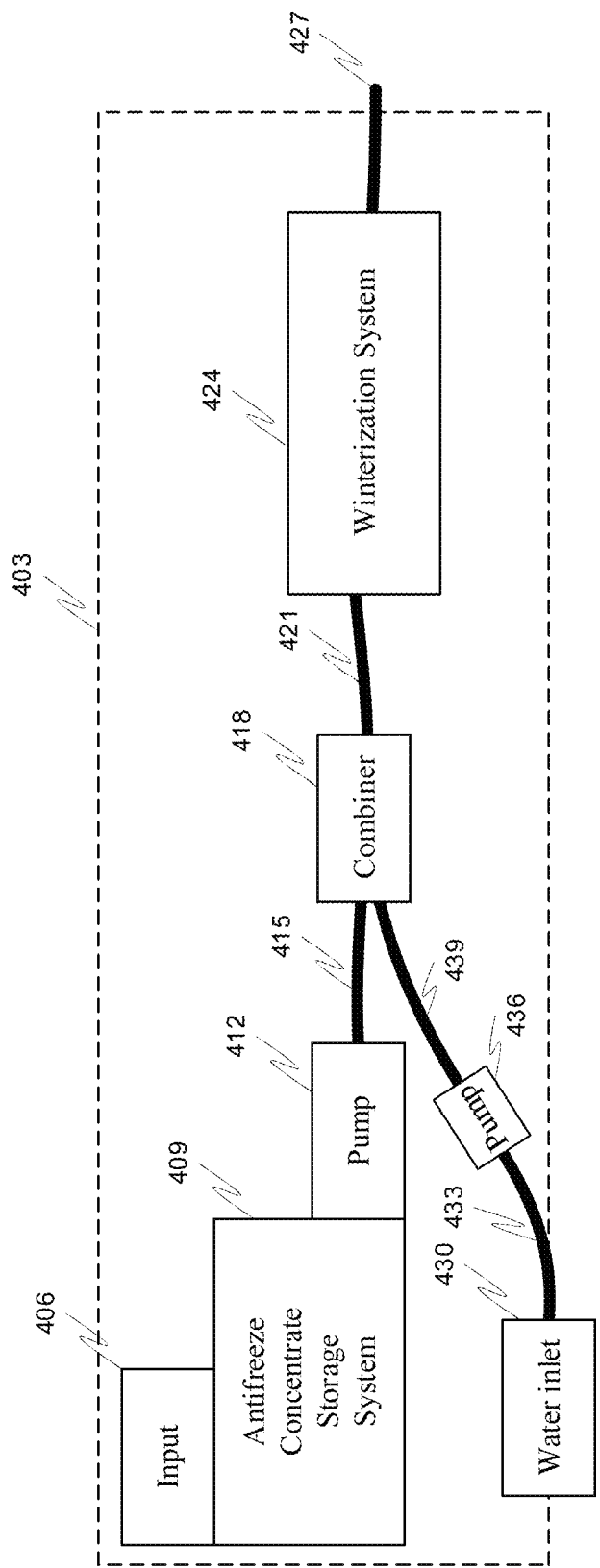
FIG. 4 is a block diagram of a winterization system using antifreeze concentrate in accordance with one or more of the disclosed embodiments.

In some embodiments, a combiner 418 element may be used to combine antifreeze concentrate with water or another liquid to generate regular strength antifreeze as illustrated in FIG. 4. As can be appreciated from FIG. 4, a vessel 403 may comprise an antifreeze concentrate storage system 409 as well as a water inlet port 430. A vessel 403 may comprise an input 406 to the antifreeze concentrate storage system 409. An input 406 may be used by a user of the vessel 403 to add antifreeze concentrate to the antifreeze concentrates storage system 409. A pump 412 may be connected to the antifreeze concentrate storage system 409 and maybe capable of pumping antifreeze concentrate from the antifreeze concentrates storage systems 409 via one or more various tubes, lines, pipes 415. A water inlet port 430 may allow water to be pumped into one or more water lines, tubes, pipes 433 of the vessel 403. A pump 436 may be used to pump water into the vessel 403 via the water inlet port 430. Water and antifreeze concentrate may be combined to create regular strength antifreeze by a combiner system 418. Water may flow into the combiner system 418 via a tube 439. Antifreeze concentrate may flow into the combiner system 418 via a tube 415.

Mixed antifreeze may be pumped into a vessel winterization system 424 via a tube 421. After flowing through the winterization system 424, the mixed antifreeze may flow out of the vessel via one or more outlet ports 427.

Figure 5:
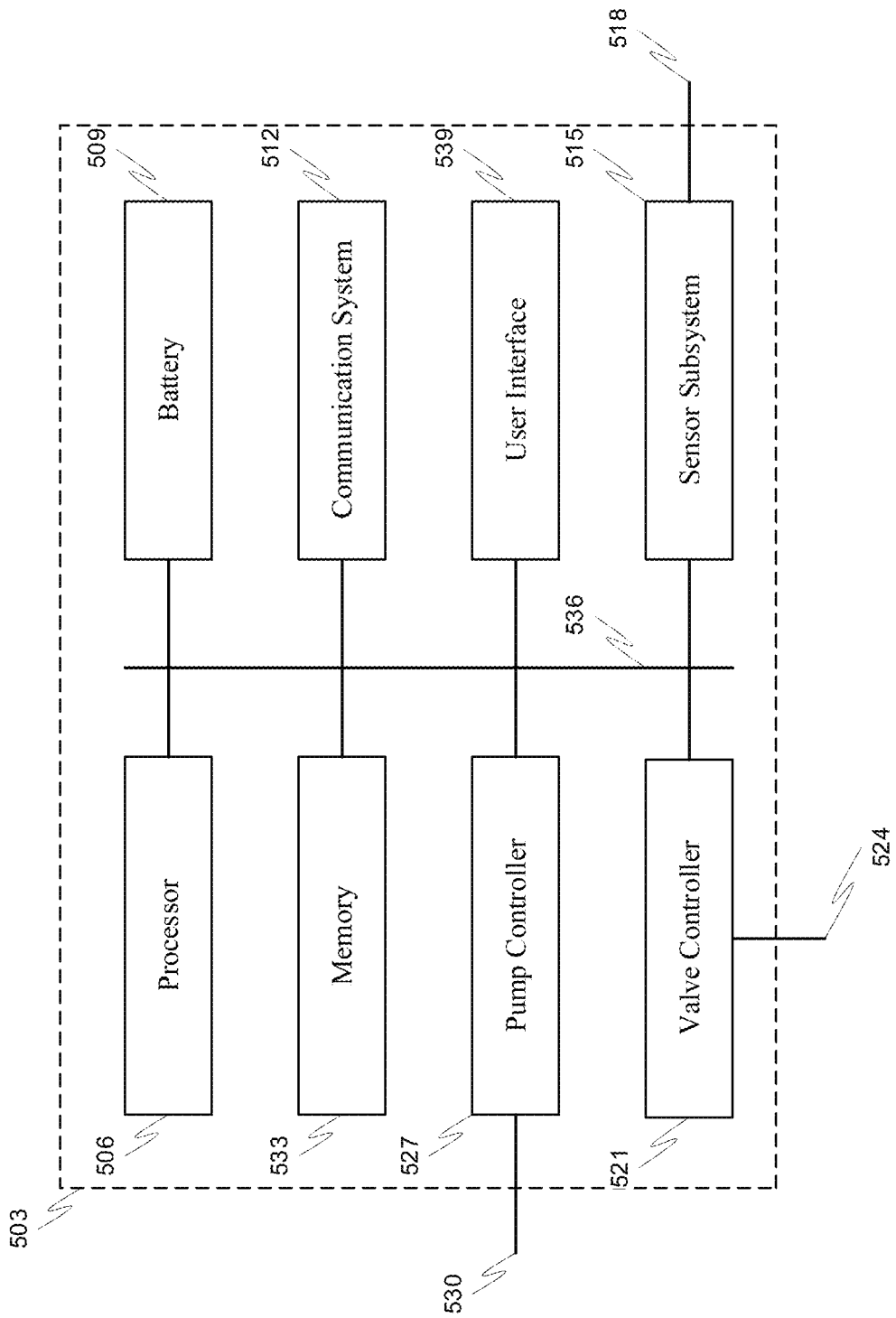
FIG. 5 is a block diagram of a control system for a winterization system in accordance with one or more of the disclosed embodiments.

In some embodiments, winterization elements may be monitored and/or controlled by one or more computer systems 503 as illustrated in FIG. 5. In some embodiments, controls can be engaged automatically or manually. Automatically activated elements may comprise but are not limited to one or more switches to turn on the system, an application on a mobile device, the opening of one or more valves. While some valves may be controlled by a computer system, in some embodiments antifreeze and/or water may be diverted with manual valves.

A computer system 503 may comprise one or more processors 506, memory systems 533, batteries 509. A computer system 503 may further comprise one or more communication system elements 512, such as WIFI, LTE, Bluetooth, etc. A user may interact with the computer system 503 through the use of an application on a smartphone or other computing device. The computer system 503 may also comprise one or more user interface elements 539.

The computer system 503 may comprise one or more elements capable of interfacing with and controlling elements such as pumps, valves, and/or sensors associated with the winterization system. For example, the computer system 503 may comprise a pump controller 527 which may be in communication with one or more pumps via a communication channel 530. In some embodiments, the computer system 503 may comprise a valve controller 521 which may be in communication with one or more valves via a communication channel 524. The computer system 503 may also comprise a sensor subsystem 515 which may be in communication with one or more sensors via a communication channel 518.

In some embodiments, a user may initiate the onboard winterization system in a number of ways, for example activating one or more switches and/or valves. An onboard winterization system may be customizable and be able to winterize one or more particular components by command of a user. For example, a user may decide only to winterize an onboard sink. The onboard winterization system may be capable of winterizing that one particularly chosen component. A user may select multiple particular components, or may instruct the onboard winterization system to winterize the entire system.

In order, to protect key vessel components, a user may be capable of initiating the system to draw antifreeze into key components by activating one or more switches and/or valves as needed to some or all desired components. In some embodiments, a user may run a fully automated protocol by activating a switch/module/computer or, through the use of a handheld/smart device, etc.

Figure 6:
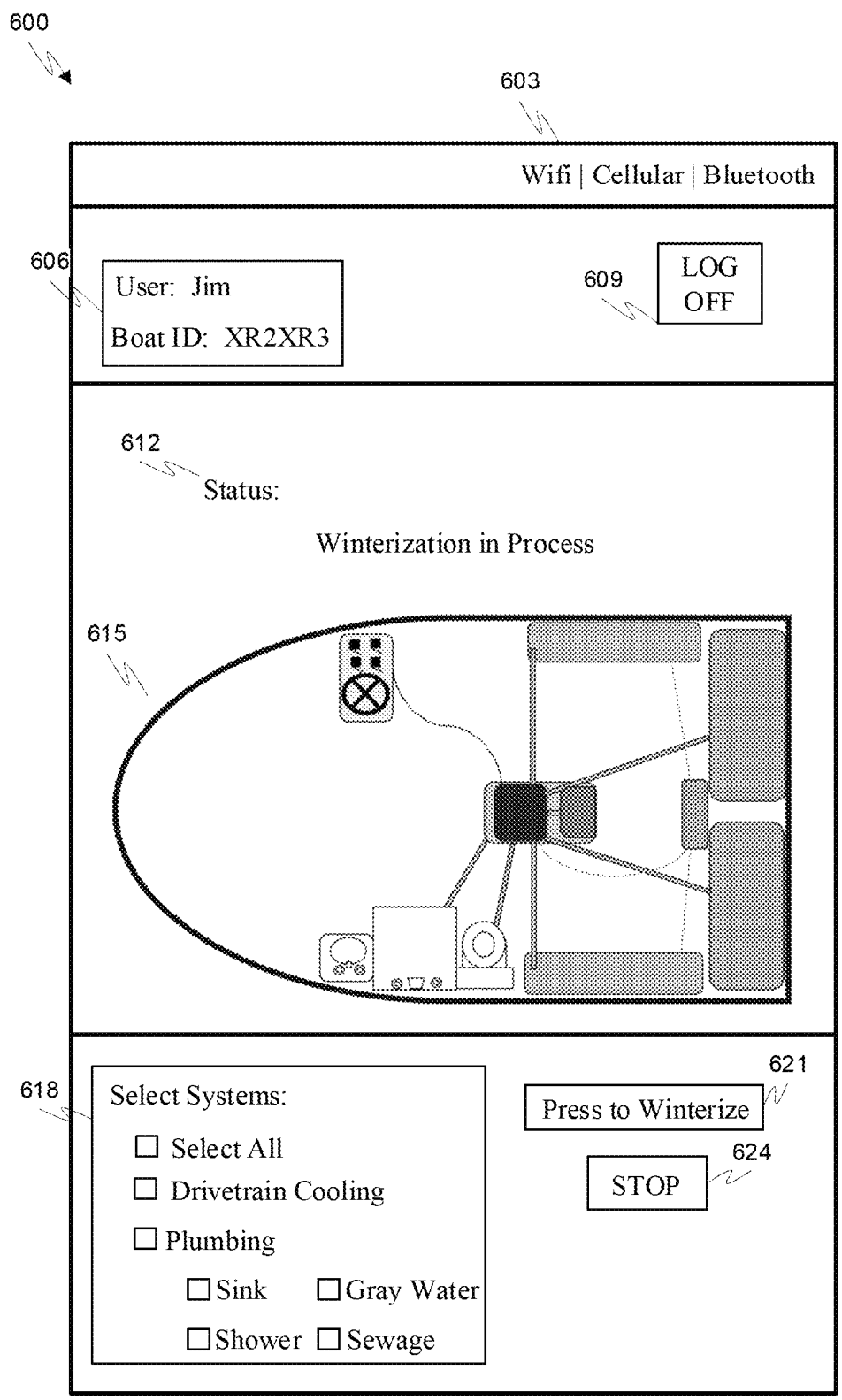
FIG. 6 is an illustration of a user interface for a mobile device for controlling a winterization system in accordance with one or more of the disclosed embodiments.

In some embodiments, winterization may be controlled by a user interface 600 of a personal computing device as illustrated in FIG. 6. A user interface 600 may comprise an indication of communication systems 603 connected to a communication of a computing system of a vessel. A user interface 600 may also comprise a user account and/or vessel account 606. A user of the user interface 600 may be capable of logging off 609 such that the user interface 600 may be used with multiple vessels. The user interface 600 may display a current status 612 of a vessel, as well as a visual representation 615 of the vessel.

A user interface 600 may enable a user of the personal computing device to select one or more system elements of a vessel to be winterized via a selection menu 618. The user interface 600 may also allow a user to start 621 or stop 624 a winterization system process.

Figure 7:
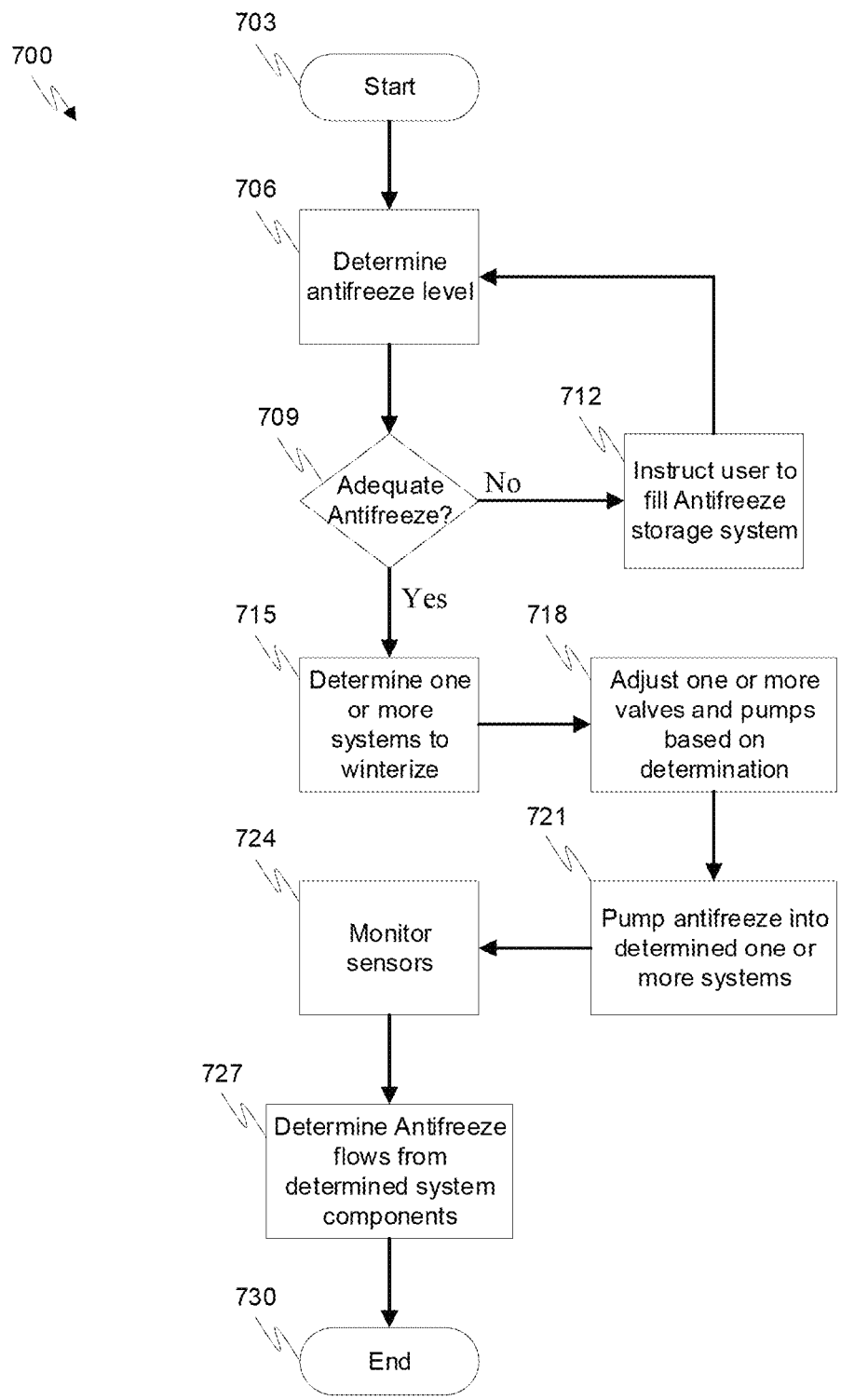
FIG. 7 is a flowchart of a method of using a winterization system in accordance with one or more of the disclosed embodiments.

A method 700 of winterizing components of a vessel, vehicle, or building may be as illustrated in the flowchart of FIG. 7. The method 700 may start 703 upon a user initiating a winterization process from one or more of an onboard control system and/or remotely via a personal computing device. For example, in the case of winterizing a recreational vehicle or vessel, the control system may be onboard the recreational vehicle or vessel. In the case of winterizing a cabin or tiny home, the control system may be located within or near the home or cabin.

The method 700 may comprise a step 706 of determining a level of antifreeze in an antifreeze storage system. The level of antifreeze in the antifreeze storage system of a vessel, RV, or building may be monitored by one or more sensors within the antifreeze storage system. The one or more sensors may be in communication with a controller onboard the vessel, RV, or building. The controller may, by reading sensor levels, determine whether enough antifreeze to perform the winterization system is in the antifreeze storage system in step 709. In some embodiments, the antifreeze storage system may comprise multiple containers. If, in step 712, it is determined that antifreeze storage systems onboard the vessel, RV, or building hold an inadequate amount of antifreeze, the control system may instruct a user to add an amount of antifreeze into the antifreeze storage system, after which the method 700 may return to a step 706 of determining the antifreeze level.

If, in step 712, it is determined that antifreeze storage systems onboard the vessel, RV, or building hold an adequate amount of antifreeze, the control system may next determine one or more systems of the vessel to winterize in step 715. The control system may determine one or more systems of the vessel to winterize based on a number of factors. In some embodiments, the control system may simply determine to winterize all systems of the vessel, RV, or building. In some embodiments, a user may adjust a series of onboard switches to select a number of systems. A user may select a number of systems using a user interface of a personal computing devices, such as a smart phone, as described herein.

After determining one or more systems of the vessel, RV, or building to winterize, the method 700 may comprise adjusting one or more valves and/or pumps of the vessel, RV, or building based on the systems to be winterized in step 718. For example, a control system of a vessel may adjust valves throughout the vessel such that antifreeze may flow throughout the determined systems to winterize. Once the valves have been adjusted, the system may then initiate one or more pumps throughout the vessel to allow antifreeze to flow from an antifreeze storage system through the determined systems to winterize. After adjusting one or more valves and/or pumps of the vessel, RV, or building based on the systems to be winterized, the method 700 may comprise pumping antifreeze from the antifreeze storage system into the determined one or more systems of the vessel, RV, or building to winterize in step 721.

After pumping antifreeze from the antifreeze storage system into the determined one or more systems of the vessel, RV, or building to winterize, the method 700 may comprise monitoring sensors along tubes within the system in step 724. Using sensors, a control system onboard the vessel may be capable of monitoring the flow of antifreeze throughout the systems of the vessel, RV, or building.

While monitoring sensors along tubes within the system, the system may determine the flow of antifreeze has progressed through the systems to be winterized and has begun to flow out from the determined system components in step 727. For example, a sensor may be placed at an outlet of the vessel, RV, or building. The sensor may be capable of sensing when antifreeze has flown through the outlet. By monitoring such a sensor, a control system onboard the vessel, RV, or building may be capable of determining the winterizing of the vessel, RV, or building has been completed. After the winterization process has completed, the method 700 may end at step 730. At the end of the method 700, the control system may cease the pumping of antifreeze throughout the systems of the vessel, RV, or building.

Figure 8:
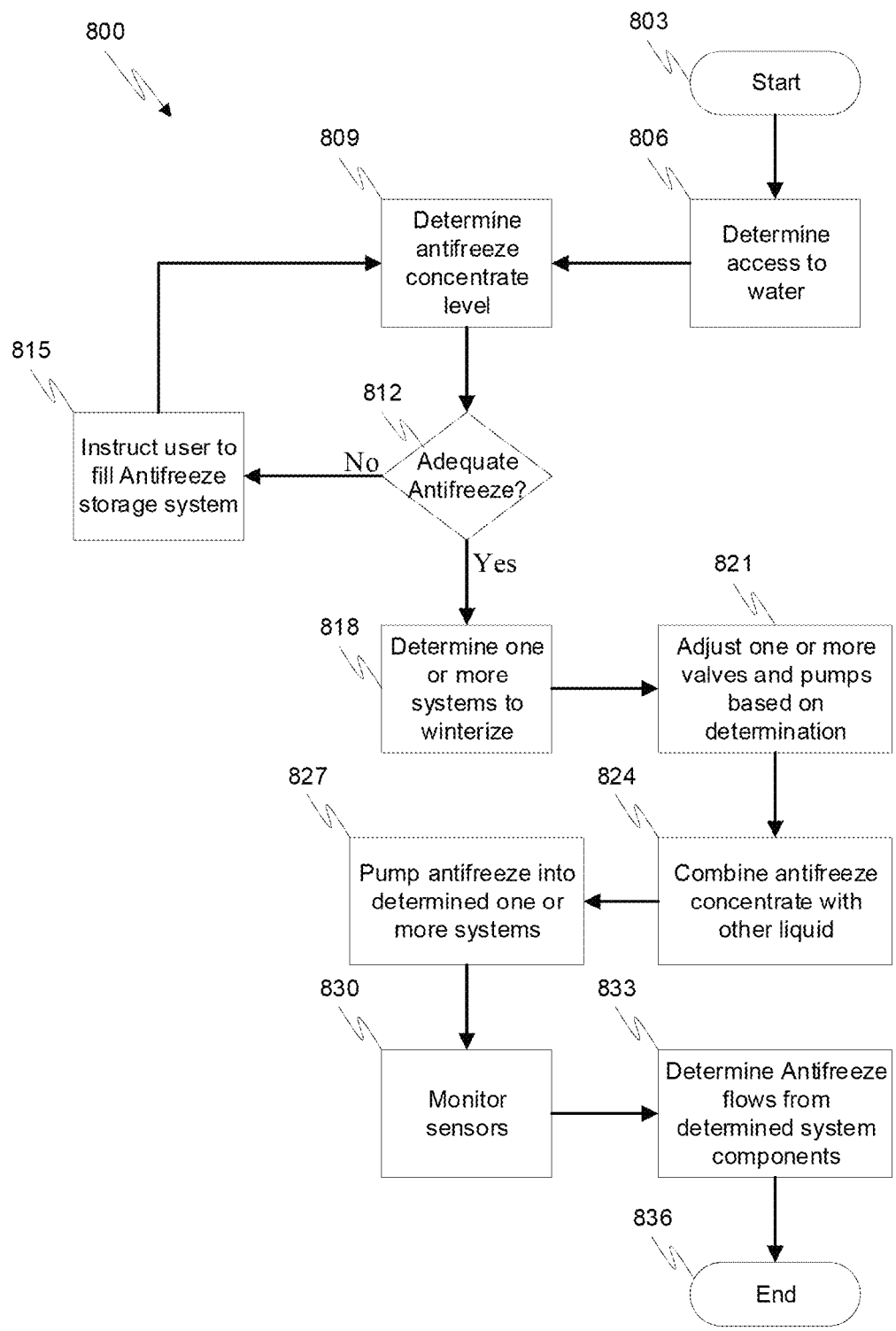
FIG. 8 is a flowchart of a method of using a winterization system in accordance with one or more of the disclosed embodiments.

A method 800 of winterizing a vessel using an antifreeze concentrate storage system may be as illustrated in the flowchart of FIG. 8. The method 800 may start 803 upon a user initiating a winterization process from one or more of an onboard control system and/or remotely via a personal computing device.

The method 800 may comprise a step 806 of determining whether the winterizing system has access to water. In some embodiments, water to be mixed with antifreeze concentrate may be stored onboard the vessel. In some embodiments, water to be mixed with antifreeze concentrate may be accessed from a body of water in which the vessel is floating.

The method 800 may comprise a step 809 of determining a level of antifreeze concentrate in an antifreeze concentrate storage system. The level of antifreeze concentrate in the antifreeze concentrate storage system of a vessel may be monitored by one or more sensors within the antifreeze concentrate storage system. The one or more sensors may be in communication with a controller onboard the vessel.

The controller may, by reading sensor levels, determine whether enough antifreeze to perform the winterization system is in the antifreeze concentrate storage system in step 812. In some embodiments, the antifreeze concentrate storage system may comprise multiple containers. If, in step 815, it is determined that antifreeze concentrate storage systems onboard the vessel hold an inadequate amount of antifreeze concentrate, the control system may instruct a user to add an amount of antifreeze concentrate into the antifreeze concentrate storage system, after which the method 800 may return to a step 809 of determining the antifreeze level.

If, in step 812, it is determined that antifreeze concentrate storage system onboard the vessel holds an adequate amount of antifreeze, the control system may next determine one or more systems of the vessel to winterize in step 818. The control system may determine one or more systems of the vessel to winterize based on a number of factors. In some embodiments, the control system may simply determine to winterize all systems of the vessel. In some embodiments, a user may adjust a series of onboard switches to select a number of systems. A user may select a number of systems using a user interface of a personal computing devices, such as a smart phone, as described herein.

After determining one or more systems of the vessel to winterize, the method 800 may comprise adjusting one or more valves and/or pumps of the vessel based on the systems of the vessel to winterize in step 821. For example, a control system of the vessel may adjust valves throughout the vessel such that antifreeze may flow throughout the determined systems to winterize. Once the valves have been adjusted, the system may then initiate one or more pumps throughout the vessel to allow antifreeze to flow from an antifreeze storage system through the determined systems to winterize.

After adjusting one or more valves and/or pumps of the vessel based on the systems of the vessel to winterize, the method 800 may comprise combining antifreeze concentrate from the antifreeze concentrate storage system with water to create antifreeze in step 824. The antifreeze may next be pumped into the determined one or more systems of the vessel to winterize in step 827.

After pumping antifreeze from the antifreeze storage system into the determined one or more systems of the vessel to winterize, the method 800 may comprise monitoring sensors along tubes within the system in step 830. Using sensors, a control system onboard the vessel may be capable of monitoring the flow of antifreeze throughout the systems of the vessel.

While monitoring sensors along tubes within the system, the system may determine the flow of antifreeze has progressed through the systems to be winterized and has begun to flow out from the determined system components in step 830. For example, a sensor may be placed at an outlet of the vessel. The sensor may be capable of sensing when antifreeze has flown through the outlet. By monitoring such a sensor, a control system onboard the vessel may be capable of determining the winterizing of the vessel has been completed. After the winterization process has completed, the method 800 may end at step 833. At the end of the method 800, the control system may cease the pumping of antifreeze throughout the systems of the vessel. The foregoing discussion of the invention has been presented for purposes of illustration and description. Further, the description is not intended to limit the invention to the form disclosed herein. For example, while certain embodiments describe a system for the winterization of boats and other types of vessels, the disclosure should not be considered as being so limited. The winterization of any type of plumbing system, such as in a motor home or other type of recreational vehicle ("RV"), in a vacation home such as a cabin or tiny home may very similar or the same as the onboard winterization systems described herein. Winterization systems may be associated with any one or more of vessels with fresh water systems, camping vessels such as campers, trailers, motorhomes, popups, Coaches, Toter homes, expedition campers, vans for camping, expedition campers, and other types of RVs, etc. Any type of vessel or vehicle, such as modul, bus, truck sleeper, semi trucks, etc. may be winterized as described herein.

Furthermore, winterization systems as described herein may be used with water systems such as hot tubs, spas, swimming pools, saunas, etc. Winterization systems may also be used with buildings such as vacation homes. For example, plumbing systems of condos, houses, mansions, tiny homes, trailer homes, modular homes, and manufactured homes may be winterized using systems as described herein.

Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with the various modifications required by their particular application or use of the invention. It is intended that the appended claims be construed to include alternative embodiments to the extent permitted by the prior art.

What is claimed is:

1. An apparatus for winterizing system components of a vehicle, the apparatus comprising:
  two or more system components comprising a ballast and one or more of an engine, a heat exchanger, and a plumbing system of the vehicle;
  an antifreeze storage system;

one or more pumps capable of pumping antifreeze from the antifreeze storage system; and a control system configured to determine one or more of the two or more system components to be winterized and one or more of the two or more system components to not be winterized and to control a flow of the antifreeze through the determined one or more system components to be winterized.

2. The apparatus of claim 1, wherein the antifreeze storage system comprises antifreeze concentrate.

3. The apparatus of claim 2, wherein the antifreeze concentrate is combined with water prior to entering the one or more system components.

4. The apparatus of claim 1, wherein the control system is in communication with a user device.

5. The apparatus of claim 4, wherein the control system is in communication with one or more sensors, wherein the control system is capable of determining that one or more system components have been winterized.

6. The apparatus of claim 4, wherein winterizing the system components is initiated remotely.

7. The apparatus of claim 1, wherein antifreeze is held within the ballast after the flow of the antifreeze is controlled through the determined one or more system components to be winterized.

8. A method for winterizing system components of a vehicle, the method comprising:

determining, by a control system, one or more of two or more system components to be winterized and one or more of the two or more system components to not be winterized, the two or more system components comprising a ballast and one or more of an engine, a heat exchanger, and a plumbing system of the vehicle; and controlling, using one or more pumps capable of pumping antifreeze from an antifreeze storage system, a flow of the antifreeze from the antifreeze storage system through the determined one or more system components to be winterized.

9. The method of claim 8, wherein the antifreeze storage system comprises antifreeze concentrate.

10. The method of claim 9, wherein the antifreeze concentrate is combined with water prior to entering the one or more system components.

11. The method of claim 8, wherein the control system is in communication with a user device.

12. The method of claim 11, wherein the control system is in communication with one or more sensors, wherein the control system is capable of determining that one or more system components have been winterized.

13. The method of claim 8, wherein winterizing the system components is initiated remotely.

14. A computer program product comprising:

a non-transitory computer-readable storage medium having computer-readable program code embodied therewith, the computer-readable program code configured when executed by a processor to:

determine, by a control system, one or more of two or more system components of a vehicle to be winterized and one or more of the two or more system components to not be winterized, the two or more system components comprising a ballast and one or more of an engine, a heat exchanger, and a plumbing system of the vehicle; and controlling, using one or more pumps capable of pumping antifreeze from an antifreeze storage system, a flow of the antifreeze through the determined one or more system components to be winterized.

15. The computer program product of claim 14, wherein the antifreeze storage system comprises antifreeze concentrate.

16. The computer program product of claim 15, wherein the antifreeze concentrate is combined with water prior to entering the one or more system components.

17. The computer program product of claim 14, wherein the control system is in communication with a user device.

18. The computer program product of claim 17, wherein the control system is in communication with one or more sensors, wherein the control system is capable of determining one or more system components have been winterized.

19. The computer program product of claim 18, wherein winterizing of the system components is initiated remotely.

20. The computer program product of claim 14, wherein antifreeze is held within the ballast after the flow of the antifreeze is controlled through the determined one or more system components to be winterized.

* * * * *